(12) United States Patent
Rasmussen et al.

(10) Patent No.: US 8,917,003 B2
(45) Date of Patent: Dec. 23, 2014

(54) AXIAL RETENTION OF PERMANENT MAGNET ROTOR IN HIGH SPEED GENERATOR

(75) Inventors: Roy D. Rasmussen, Janesville, WI (US); Scott R. Ganong, Stillman Valley, IL (US); Glenn C. Lemmers, Jr., Loves Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1091 days.

(21) Appl. No.: 12/436,164

(22) Filed: May 6, 2009

(65) Prior Publication Data

US 2010/0283346 A1    Nov. 11, 2010

(51) Int. Cl.
| | |
|---|---|
| H02K 7/10 | (2006.01) |
| H02K 1/28 | (2006.01) |
| H02K 1/27 | (2006.01) |
| H02K 19/38 | (2006.01) |

(52) U.S. Cl.
CPC ............... *H02K 1/28* (2013.01); *H02K 1/278* (2013.01); *H02K 19/38* (2013.01)
USPC ........... 310/100; 310/76; 310/156.12; 192/34

(58) Field of Classification Search
USPC ............. 310/156.01, 156.08, 156.09, 156.12, 310/156.13, 156.14, 156.18, 156.23, 310/156.28, 156.29, 156.31, 271
See application file for complete search history.

(56) References Cited

U.S. PATENT DOCUMENTS

| | | | | |
|---|---|---|---|---|
| 4,393,319 | A | * | 7/1983 | Bock ..................... 310/156.12 |
| 4,486,678 | A | | 12/1984 | Olson |
| 4,777,397 | A | * | 10/1988 | Parshall ................. 310/156.15 |
| 5,079,467 | A | * | 1/1992 | Dorman ................. 310/156.12 |
| 5,300,848 | A | | 4/1994 | Huss et al. |
| 5,747,913 | A | | 5/1998 | Amlee et al. |
| 5,828,152 | A | | 10/1998 | Takeda et al. |
| 5,881,448 | A | * | 3/1999 | Molnar ................... 310/156.28 |
| 5,894,183 | A | | 4/1999 | Borchert |
| 6,465,928 | B1 | | 10/2002 | Shervington et al. |
| 7,253,535 | B2 | | 8/2007 | Duesterhoeft |
| 7,355,309 | B2 | | 4/2008 | Costin et al. |

\* cited by examiner

*Primary Examiner* — Michael Andrews
(74) *Attorney, Agent, or Firm* — Carlson, Gaskey & Olds, PC

(57) ABSTRACT

A permanent magnet rotor for use on an electrical generator comprises a hub having an outer peripheral surface and an inner peripheral bore centered on an axis. The inner peripheral bore is provided with a screw thread at least over a portion of an axial dimension. Permanent magnets are mounted on the outer peripheral surface of the hub. A containment band is positioned radially outwardly of the magnets, holding the magnets and the hub together. The hub, a generator rotor incorporating the permanent magnet rotor, and a generator incorporating the permanent magnet rotor are also disclosed and claimed in this application.

15 Claims, 2 Drawing Sheets

AXIAL RETENTION OF PERMANENT MAGNET ROTOR IN HIGH SPEED GENERATOR

BACKGROUND OF THE INVENTION

This application relates to the axial retention of a permanent magnet rotor on a generator shaft.

Electrical generators typically include a main generator winding set mounted on a rotor shaft. The main generator windings rotate in proximity to main stator windings, and generate electricity when the shaft is driven to rotate.

The operation of modern generators is quite complex, and includes controls and safety features. A permanent magnet rotor is also fixed to the rotor shaft, and driven to rotate adjacent to its own stator. The energy generated by the rotation of the permanent magnet rotor is utilized for control or safety functions. The permanent magnet rotor is preferably precisely positioned on the rotor shaft such that it is in a desired location relative to its stator.

Typically, the permanent magnet rotor is interference fit on the rotor shaft. Under some high speed and high vibration applications, such as may be found in an aircraft application, as an example, the permanent magnet rotors have sometimes become loose and misaligned.

To address this, locking tabs and threaded locking nuts have been utilized to hold the permanent magnet rotor on the rotor shaft. However, these systems have not always adequately locked the rotor itself, and further require additional parts, thus increasing the cost and complexity of assembly, as well as increasing the length and weight of the generator.

SUMMARY OF THE INVENTION

A hub for a permanent magnet rotor in an electrical generator includes a hub body having an outer peripheral surface and an inner peripheral bore centered on an axis. The inner peripheral bore is provided with a screw thread at least over a portion of an axial dimension from adjacent a first end. A piloting diameter on the inner peripheral bore is larger than a diameter to a tip of the screw thread. The piloting diameter is for piloting on a shaft that is to receive the hub.

A permanent magnet rotor for use on an electrical generator comprises a hub having an outer peripheral surface and an inner peripheral bore centered on an axis. The inner peripheral bore is provided with a screw thread at least over a portion of an axial dimension. Permanent magnets are mounted on the outer peripheral surface of the hub. A containment band is positioned radially outwardly of the magnets, holding the magnets and the hub together.

A generator rotor includes a main winding mounted on a rotor shaft. A permanent magnet rotor includes a hub having an outer peripheral surface and an inner peripheral cylindrical bore centered on an axis. The inner peripheral bore is provided with a screw thread at least over a portion of an axial dimension. Permanent magnets are mounted on the outer peripheral surface of the hub. A containment band is positioned radially outwardly of the magnets holding the magnets and hub together. The rotor shaft has threads received on the threads on the inner peripheral bore.

A generator includes a main winding stator, and a stator for a permanent magnet rotor. A main winding rotor is mounted on a rotor shaft. A permanent magnet rotor includes a hub having an outer peripheral surface and an inner peripheral cylindrical bore centered on an axis. The inner peripheral bore is provided with a screw thread at least over a portion of an axial dimension. Permanent magnets are mounted on the outer peripheral surface of the hub. A containment band is positioned radially outwardly of the magnets holding the magnets and hub together. The rotor shaft has threads received on the threads on the inner peripheral bore.

These and other features of the present invention can be best understood from the following specification and drawings, the following of which is a brief description.

DETAILED DESCRIPTION OF THE PREFERRED EMBODIMENT

Figure 1:
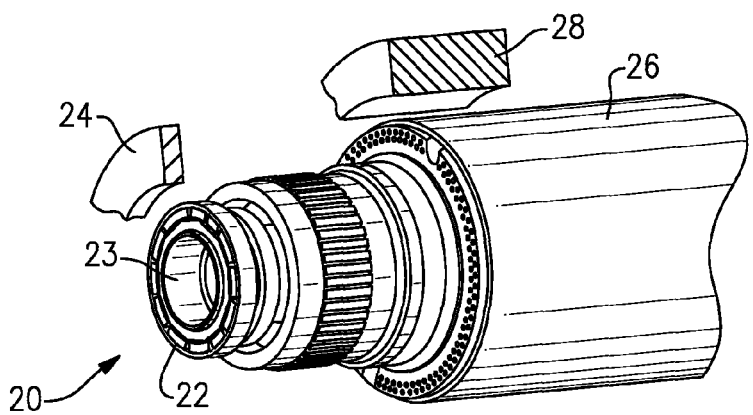
FIG. 1 is a view of a generator.

A generator 20 is illustrated in FIG. 1 having a permanent magnet rotor 22 fixed to a rotor shaft 23. The permanent magnet rotor 22 rotates when the shaft 23 is driven to rotate, and adjacent to a stator 24. The rotation of the permanent magnet rotor 22 adjacent to the stator 24 generates electrical power which may be utilized for control or safety features, as known. A main winding set 26 rotates adjacent to a main stator set 28, and generates electrical power for uses, such as for on an aircraft. One common application of the generator shown in FIG. 1 is to be driven by the gas turbine engines of a jet aircraft.

Figure 2:
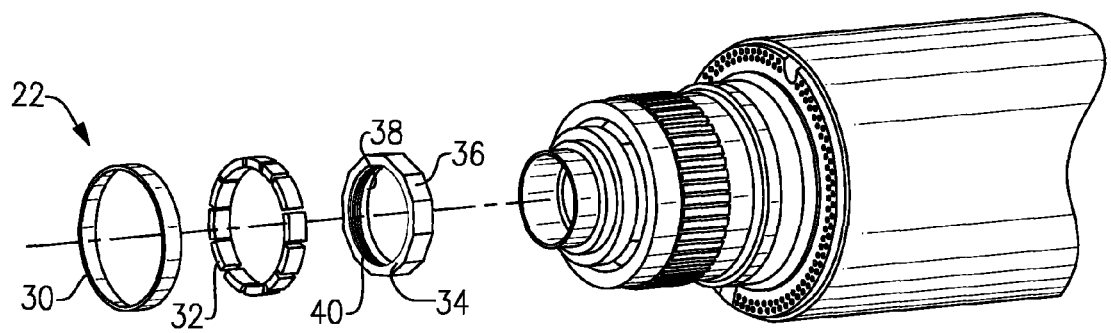
FIG. 2 is an exploded view of a permanent magnet rotor.

FIG. 2 is an exploded view of the permanent magnet rotor 22. As shown, a containment band 30 surrounds a plurality of permanent magnets 32. A hub 34 includes outer facets 36 which each mount a magnet 32. Due to facets 36, the outer periphery of hub 34 is polygonal. An inner bore of the hub 34 includes a piloting boss 38, and threads 40. As shown, a piloting boss is at one end of the bore, and beyond threads 40.

Figure 3:
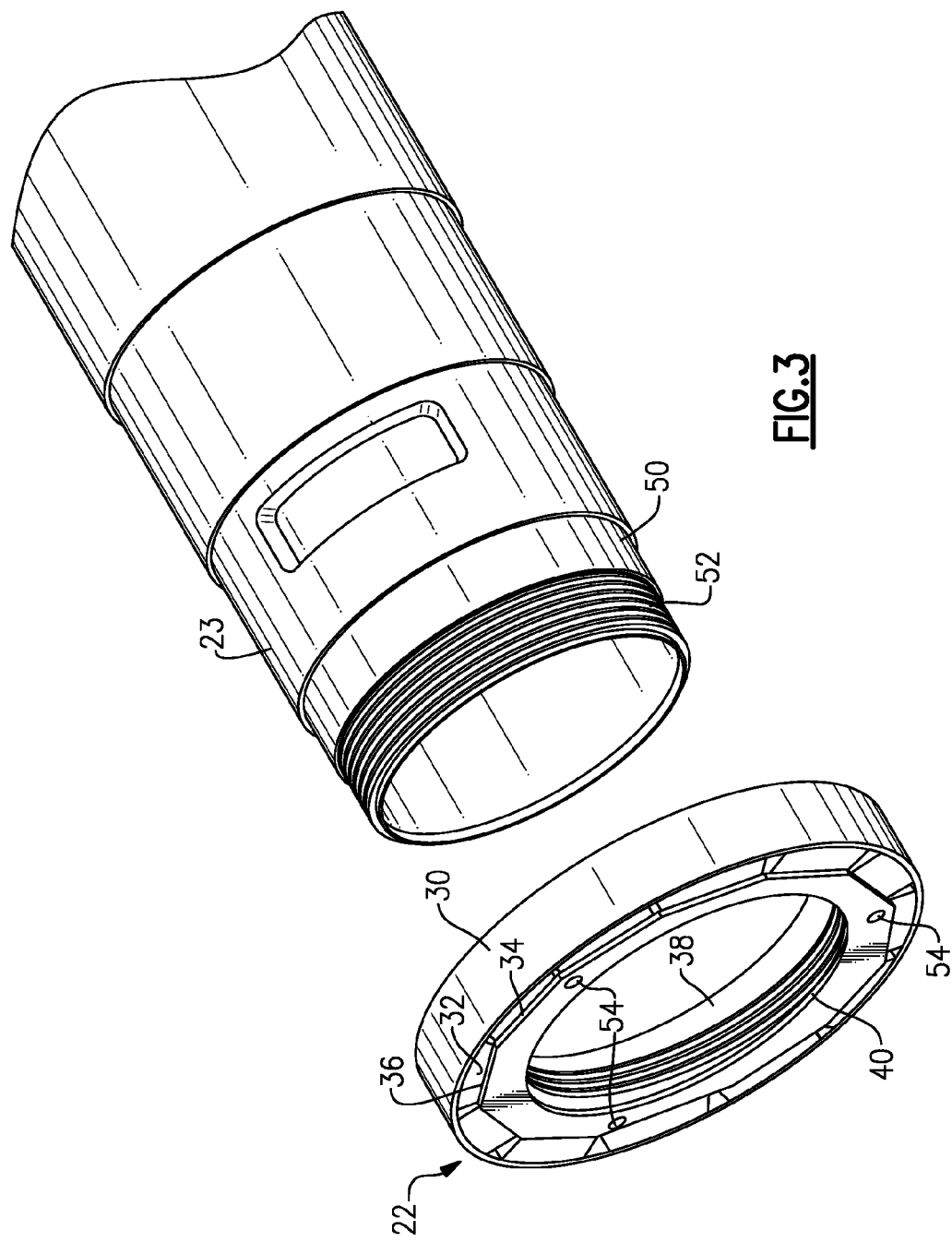
FIG. 3 is an exploded view of components of the generator.

FIG. 3 shows the permanent magnet rotor 22 assembled. As can be seen, the piloting diameter 38 faces the shaft 23, and the threads 40 are at an axial outer location. Threads 52 are formed on the shaft 23, and a piloting diameter 50 is also formed. To assemble the permanent magnet rotor 22 onto the shaft 23, the piloting diameter 38 is initially placed on the piloting diameter 50. This centers the rotor 22 properly on the shaft 23. Next, torque tool holes 54 receive a torque tool which may then be driven to rotate the permanent magnet rotor 22 onto the shaft 23 such that the threads 40 engage on the threads 52, locking and properly positioning the permanent magnet rotor 22 on the shaft 23.

Figure 4:
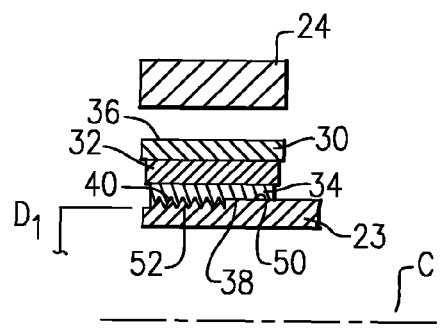
FIG. 4 is a cross-sectional view through the assembled permanent magnet rotor.
Figure 4:
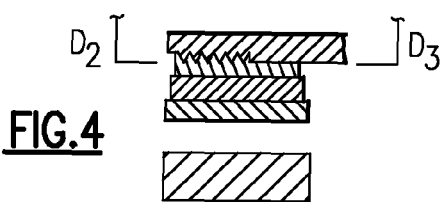

As shown in FIG. 4, when assembled, a central axis C of the shaft 23 extends through the shaft 23 and the hub 34. As can be appreciated in FIG. 4, the threads 40 on the inner diameter of the hub 34 are axially aligned with portions of the magnets 32. Stated another way, a plane could be defined that is perpendicular to axis C, and which extends both through the threads 40 and through portions of the magnets 32.

As shown in FIG. 4, a first diameter D1 can be defined to a root of the threads 52 on the shaft 23. That same diameter would be effectively equal to a tip of the threads 40 on the hub 34.

A second diameter D2 can be defined to the tip of the threads 52 on the shaft 23, or the root of the threads 40 on the hub 34. A third diameter D3 extends to the piloting surfaces. While there are slight differences between these diameters, with regard to the diameters on the shaft 23, D1 is between 1.8730" (47.574 mm) and 1.8798" (47.746 mm). The diameter D2 is between 1.9294" (49.007 mm) and 1.9375" (49.212 mm) and the diameter D3 is between 2.0165" (51.219 mm) and 2.0160" (51.20 mm). In embodiments, the ratio of D1 to D3 is between 1.07 and 1.08. This ratio holds true as to the hub, as well as the shaft.

It is preferred that the design of the threads 52 and 40 provide that the torque on the permanent magnet rotor 22 when it is driven in its expected direction during operation will serve to further tighten the permanent magnet rotor 22 on the shaft 23, rather than being in a loosening opposed direction. In one embodiment, the screw threads were 20 threads per inch. The thread utilized on the hub was a self-locking thread available under the trade name Spiralok.

To assemble the permanent magnet rotor 32, the magnets may be sintered. The individual magnets are magnetized, tested, and stabilized. They may then be epoxy-bonded to the facets on the hub. The hub may be made of an appropriate steel. The outer diameter of the magnets may be machined to size. The epoxy bond is desired to keep the magnets in place during this machining. A containment band 30 is then heated and assembled around the magnet. As the band cools, it forms an interference fit holding the magnets, hub, and containment band together. Of course, other methods may be used Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A hub for being part of a permanent magnet rotor in an electrical generator, the hub comprising:
a hub body having an outer peripheral surface and an inner peripheral bore centered on an axis, said inner peripheral bore being provided with a screw thread over a portion of an axial dimension from adjacent a first end;
a piloting diameter on the inner peripheral bore being of a diameter larger than a diameter of a tip of said screw thread, said piloting diameter for piloting on a shaft that is to receive said hub; and
said hub outer peripheral surface having a polygonal shape, said polygonal shape being defined by a plurality of outer facets, and a plane can be defined perpendicular to said axis, and said plane extending through said threads on said inner peripheral bore, and through said facets.

2. The hub as set forth in claim 1, wherein torque tool holes for receiving a torque tool to drive said hub onto a rotor shaft are included in said hub.

3. The hub as set forth in claim 1, wherein a ratio of said diameter to said piloting diameter compared to the diameter to the tip of said screw threads being between 1.07 and 1.08.

4. A permanent magnet rotor for use on an electrical generator comprising:
a hub having an outer peripheral surface and an inner peripheral bore centered on an axis, said inner peripheral bore being provided with a screw thread at least over a portion of an axial dimension;
permanent magnets mounted on said outer peripheral surface of said hub;
a containment band positioned radially outwardly of said magnets, and holding said magnets and said hub together; and
a plane can be defined that is perpendicular to said axis, said plane extending through said threads on said inner peripheral bore, and through said permanent magnets.

5. The permanent magnet rotor as set forth in claim 4, wherein said inner peripheral bore also includes a piloting surface at an end beyond said threads, said piloting surface having a diameter larger than a diameter of a tip of said screw thread.

6. The permanent magnet rotor as set forth in claim 5, wherein a ratio of a diameter to said piloting surface compared to a diameter to an inner peripheral tip of said screw threads being between 1.07 and 1.08.

7. The permanent magnet rotor as set forth in claim 4, wherein said hub has torque tool holes for receiving a torque tool to drive said permanent magnet rotor onto a rotor shaft which will receive said permanent magnet rotor.

8. A generator rotor comprising:
a main winding rotor mounted on a rotor shaft;
a permanent magnet rotor including a hub having an outer peripheral surface and an inner peripheral cylindrical bore centered on an axis, said inner peripheral bore being provided with a screw thread at least over a portion of an axial dimension, permanent magnets mounted on said outer peripheral surface of said hub, a containment band positioned radially outwardly of said magnets, and holding said magnets and said hub together, said rotor shaft having threads received on said threads on said inner peripheral bore; and
a plane can be defined that is perpendicular to said axis, said plane extending through said threads on said rotor shaft, said threads on said inner peripheral bore of said rotor hub, and through said permanent magnets.

9. The generator rotor as set forth in claim 8, wherein said inner peripheral bore of said hub includes a piloting surface at an end of said hub beyond said threads, and said rotor shaft further being provided with a mating piloting surface, said piloting surface on said inner peripheral bore of said hub having a diameter that is larger than a diameter of a tip of said screw thread on said inner peripheral bore of said hub.

10. The generator rotor as set forth in claim 9, wherein a ratio of a diameter to said piloting surface compared to a diameter to an inner peripheral tip of said screw threads on said hub being between 1.07 and 1.08.

11. The generator rotor as set forth in claim 8, wherein said hub has torque tool holes for receiving a torque tool to drive said permanent magnet rotor onto said rotor shaft.

12. A generator comprising:
a main winding stator, and a stator for a permanent magnet rotor;
a main winding rotor mounted on a rotor shaft;
a permanent magnet rotor including a hub having an outer peripheral surface and an inner peripheral cylindrical bore centered on an axis, said inner peripheral bore being provided with a screw thread at least over a portion of an axial dimension, permanent magnets mounted on said outer peripheral surface of said hub, a containment band positioned radially outwardly of said magnets, and holding said magnets and said hub together, said rotor shaft having threads received on said threads on said inner peripheral bore; and
a plane can be defined that is perpendicular to said axis, said plane extending through said threads on said rotor shaft, said threads on said inner peripheral bore of said rotor hub, and through said permanent magnets.

13. The generator as set forth in claim 12, wherein said inner peripheral bore of said hub includes a piloting surface at an end of said hub beyond said threads, and said rotor shaft further being provided with a mating piloting surface, said piloting surface on said inner peripheral bore of said hub having a diameter that is larger than a diameter of a tip of said screw thread on said inner peripheral bore of said hub.

14. The generator as set forth in claim 13, wherein a ratio of a diameter to said piloting surface compared to a diameter to an inner peripheral tip of said screw threads on said hub being between 1.07 and 1.08.

15. The generator as set forth in claim 12, wherein said hub has torque tool holes for receiving a torque tool to drive said permanent magnet rotor onto said rotor shaft.

\* \* \* \* \*